United States Patent
Yu

(10) Patent No.: US 12,425,947 B2
(45) Date of Patent: Sep. 23, 2025

(54) WIRELESS COMMUNICATION METHOD AND APPARATUS, DEVICE, STORAGE MEDIUM, AND COMPUTER PROGRAM PRODUCT

(71) Applicant: Tencent Technology (Shenzhen) Company Limited, Guangdong (CN)

(72) Inventor: Yifan Yu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 395 days.

(21) Appl. No.: 17/986,760

(22) Filed: Nov. 14, 2022

(65) Prior Publication Data
US 2023/0071561 A1     Mar. 9, 2023

Related U.S. Application Data

(63) Continuation of application No. PCT/CN2021/125275, filed on Oct. 21, 2021.

(30) Foreign Application Priority Data

Nov. 6, 2020 (CN) .......................... 202011231805.9

(51) Int. Cl.
| H04W 40/24 | (2009.01) |
| H04L 61/2503 | (2022.01) |
| H04L 67/63 | (2022.01) |

(52) U.S. Cl.
CPC ......... *H04W 40/24* (2013.01); *H04L 61/2503* (2013.01); *H04L 67/63* (2022.05)

(58) Field of Classification Search
None
See application file for complete search history.

(56) References Cited

U.S. PATENT DOCUMENTS

| 2007/0263633 A1* | 11/2007 | He | H04L 12/56 370/395.2 |
| 2017/0366618 A1* | 12/2017 | Vrzic | H04L 67/148 |
| 2021/0120076 A1* | 4/2021 | Sun | H04L 12/4641 |

FOREIGN PATENT DOCUMENTS

| CN | 108737271 A | 11/2018 |
| CN | 109451084 A | 3/2019 |
| CN | 110769039 A | 2/2020 |
| CN | 111107171 A | 5/2020 |
| CN | 112291363 A | 1/2021 |
| WO | 2017156704 A1 | 9/2017 |

OTHER PUBLICATIONS

International Search Report and Written Opinion in PCT/CN2021/125275, mailed Jan. 18, 2022, 10 pages.
Chinese Office Action in 202011231805.9, mailed Apr. 15, 2023, 12 pages.

* cited by examiner

*Primary Examiner* — Angela Nguyen
(74) *Attorney, Agent, or Firm* — ArentFox Schiff LLP

(57) ABSTRACT

A wireless communication method is provided. In the wireless communication method, a service request transmitted by a terminal device to a local server is received. A target address of the service request is changed from a first IP address to a second IP address. The first IP address is a virtual address of the local server. The second IP address is a real address of the local server in an edge data center. A service response transmitted by the local server to the terminal device for the service request is received. A source address of the service response is changed from the second IP address to the first IP address.

20 Claims, 5 Drawing Sheets

WIRELESS COMMUNICATION METHOD AND APPARATUS, DEVICE, STORAGE MEDIUM, AND COMPUTER PROGRAM PRODUCT

RELATED APPLICATIONS

The present application is a continuation of International Application No. PCT/CN2021/125275 filed on Oct. 21, 2021, which claims priority to Chinese Patent Application No. 202011231805.9 filed on Nov. 6, 2020. The entire disclosures of the prior applications are hereby incorporated by reference in their entirety.

FIELD OF THE TECHNOLOGY

Embodiments of this application relate to the technical field of communication, including to a wireless communication method and apparatus, an electronic device, a computer-readable storage medium, and a computer program product.

BACKGROUND OF THE DISCLOSURE

European Telecommunications Standards Institute (ETSI) defines an edge computing platform architecture for mobile networks (e.g., an ETSI-defined mobile edge computing (MEC) architecture), which can be used for Internet services (e.g., enterprise in-house applications) running within local private networks. The processing logic of Internet services is complex. Usually, it is necessary to introduce an access layer into a data center located at the center of a network to schedule a server processing a specific service request. However, the ETSI-defined MEC architecture forms a private and closed service management system, and an Internet service background system cannot effectively manage and control servers deployed in the ETSI-defined MEC architecture, which affects service access.

SUMMARY

Embodiments of this disclosure include a wireless communication method and apparatus, an electronic device, a non-transitory computer-readable storage medium, and a computer program product. For example, the embodiments can deploy service access layer functions and a processing server in an edge data center, use the low latency of the edge data center to improve service access capabilities, and can use a service scheduler deployed in a central cloud of a core network to more effectively and reasonably manage and control edge services.

The embodiments of this disclosure provide a wireless communication method. In the wireless communication method, a service request transmitted by a terminal device to a local server is received. A target address of the service request is changed by an edge routing switch in an edge data center from a first IP address to a second IP address. The first IP address is a virtual address of the local server. The second IP address is a real address of the local server in the edge data center. A service response transmitted by the local server to the terminal device for the service request is received. A source address of the service response is changed from the second IP address to the first IP address.

The embodiments of this disclosure also provide a wireless communication method. In the wireless communication method, a service scheduling response is received from a service scheduler in a central cloud for a service scheduling request transmitted by a terminal device. The service scheduling response is transmitted to the terminal device. The service scheduling response includes a first IP address that is a virtual address of a local server in an edge data center. A user plane function of a wireless network receives a service request from the terminal device. A target address of the service request is the first IP address. The user plane function, according to the first IP address, transmits the service request to an edge routing switch in the edge data center. The edge routing switch is configured to transmit the service request to the local server after the edge routing switch changes the target address of the service request from the first IP address to a second IP address. The second IP address is a real address of the local server in the edge data center. The user plane function transmits a service response returned by the local server to the terminal device after the edge routing switch changes a source address of the service response returned by the local server for the service request from the second IP address to the first IP address.

The embodiments of this disclosure also provide a wireless communication system. The wireless communication system includes an edge routing switch of an edge data center. The edge routing switch includes first processing circuitry that is configured to receive a service request transmitted by a terminal device to a local server. The first processing circuitry is configured to change a target address of the service request from a first IP address to a second IP address. The first IP address is a virtual address of the local server, and the second IP address is a real address of the local server in the edge data center. The first processing circuitry is configured to receive a service response transmitted by the local server to the terminal device for the service request. The first processing circuitry is configured to change a source address of the service response from the second IP address to the first IP address.

In some embodiments of this disclosure, the wireless communication system further includes second processing circuitry of a user plane function. The second processing circuitry is configured to receive a service scheduling response from a service scheduler in a central cloud for a service scheduling request transmitted by the terminal device. The second processing circuitry is configured to transmit the service scheduling response to the terminal device. The service scheduling response includes the first IP address that is the virtual address of the local server in an edge data center. The second processing circuitry is configured to receive the service request from the terminal device, the target address of the service request being the first IP address. The second processing circuitry is configured to transmit, according to the first IP address, the service request to the edge routing switch in the edge data center. The second processing circuitry is configured to transmit the service response returned by the local server to the terminal device after the edge routing switch changes the source address of the service response returned by the local server for the service request from the second IP address to the first IP address.

An embodiment of this disclosure provides an electronic device, including a processor and a memory. The memory is configured to store executable instructions of the processor. The processor is configured to perform the wireless communication method according to the embodiments of this disclosure by executing the executable instructions.

An embodiment of this disclosure provides a non-transitory computer-readable storage medium, storing instructions which when executed by a processor cause the processor to implement the wireless communication method according to any of the embodiments of this disclosure.

An embodiment of this disclosure provides a computer program product or a computer program, the computer program product or the computer program including computer instructions, the computer instructions being stored in a computer-readable storage medium, a processor of a computer device reading the computer instructions from the computer-readable storage medium, and the processor executing the computer instructions to cause the computer device to perform the wireless communication method according to the embodiments of this disclosure.

Embodiments of this disclosure may include the following beneficial effects. According to the embodiments of this disclosure, a target address of a service request transmitted by a terminal device to a business server is changed from a first IP address to a second IP address, and a source address of a service response transmitted by the business server to the terminal device for the service request is changed from the second IP address to the first IP address. As a result, communication between the terminal device and the business server can be achieved through interchange of a virtual address and a real address. In addition, service access layer functions and a business processing server are deployed in an edge data center, the low latency of the edge data center is used to improve service access capabilities, and a service scheduler in a central cloud can be used to effectively and reasonably manage and control edge services.

DESCRIPTION OF EMBODIMENTS

Figure 1:
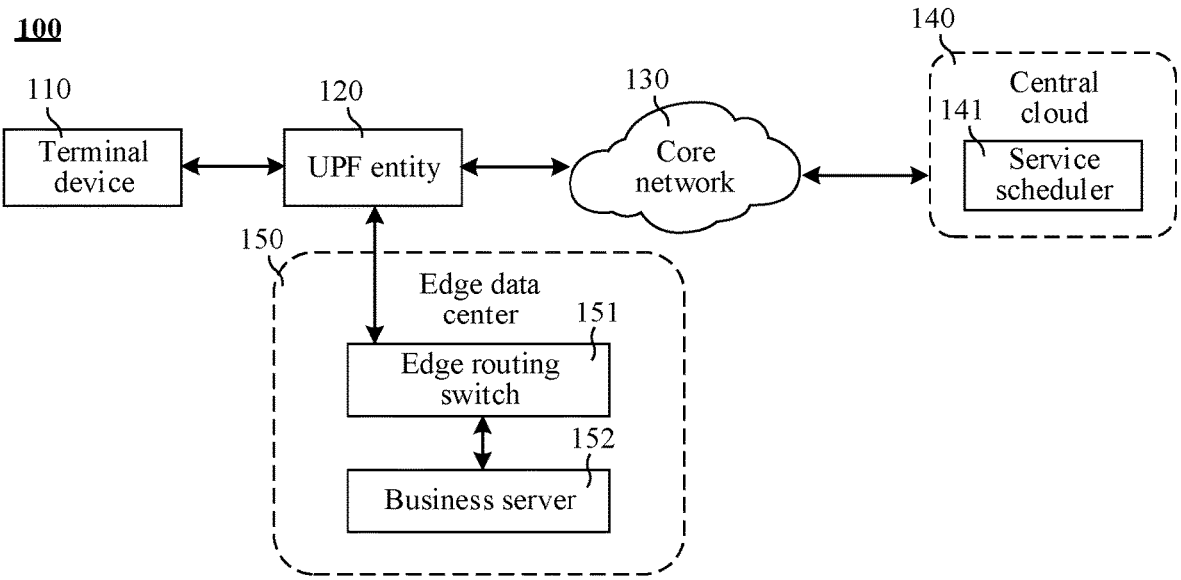
FIG. 1 is a schematic architectural diagram of a wireless communication system according to an embodiment of this disclosure.

Now, exemplary implementations are described with reference to the accompanying drawings. However, the examples of implementations may be implemented in multiple forms, and it is not to be understood as being limited to the examples described herein. Conversely, the examples of implementations are provided to make the description of this disclosure more comprehensive and complete, and convey the idea of the examples of the implementations to a person skilled in the art. The accompanying drawings are merely exemplary illustrations of this disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the examples of the implementations of this disclosure. However, a person of ordinary skill in the art is to be aware that, the technical solutions in this disclosure may be implemented without one or more of the particular details, or another method, unit, or step may be used. In other cases, well-known structures, methods, implementations, or operations are not shown or described in detail, in order not to obscure the aspects of this disclosure.

Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks, processor apparatuses, or micro-controller apparatuses.

In the following descriptions, related "some embodiments" describe a subset of all possible embodiments. However, it may be understood that the "some embodiments" may be the same subset or different subsets of all the possible embodiments, and may be combined with each other without conflict.

In the following description, the involved term "first/second" is merely intended to distinguish similar objects but does not necessarily indicate a specific order of an object. It may be understood that "first/second" is interchangeable in terms of a specific order or sequence if permitted, so that the embodiments of this disclosure described herein can be implemented in a sequence in addition to the sequence shown or described herein.

FIG. 1 is a schematic architectural diagram of a wireless communication system 100 according to an embodiment of this disclosure, and the system includes: a terminal device 110, a user plane function (UPF) entity 120, a core network 130, a central cloud 140, and an edge data center 150. The central cloud 140 includes a service scheduler 141, and the edge data center 150 can be deployed in the core network 130 and includes an edge routing switch 151 and a business server 152.

The user plane function entity 120 is an internal network element of a cellular network, and is configured to support forwarding of user data traffic between the edge data center 150 and the terminal device 110. The local business server 152 is deployed in the edge data center 150, and is configured to process service requests from the terminal device 110. The edge routing switch 151 is configured to perform data exchange between the user plane function entity 120 and the local business server 152. The service scheduler 141 is located in the central cloud 140, and is configured to select a specific local business server to process service requests from the terminal device 110.

In addition, an edge service manager is configured to perform creation, deployment, management, and maintenance of the local business server in the edge data center. The edge service manager may be a software entity or a software system.

The above core network 130 may be a core network in a 5th-generation (5G) communication network, that is, the core network 130 may be a 5G core network. The core network 130 may also be a core network in a 6th-generation (6G) communication network or other communication networks, which is not limited in the embodiments of this disclosure.

In some embodiments, the edge data center 150 may also be referred to as an edge cloud.

The terminal device may alternatively be referred to as user equipment (UE), an access terminal, a user unit, a user station, a mobile site, a mobile station, a remote station, a remote terminal, a mobile device, a user terminal, a terminal, a wireless communication device, a user agent, or a user apparatus.

The terminal device may be a station (ST) in a wireless local area network (WLAN), may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, or a next generation communication system, for example, a terminal device in the NR network, a terminal device in a future evolved public land mobile network (PLMN), or the like.

The terminal device can be deployed on land. For example, the terminal device may be an indoor or outdoor, handheld, wearable or vehicle terminal device. The terminal device can also be deployed on water (e.g., in a steamship). The terminal device can also be deployed in the air (e.g., in an airplane, a balloon, and a satellite).

The terminal device may be a mobile phone (mobile phone), a tablet computer (Pad), a computer having a wireless transmission and receiving function, a virtual reality (Virtual Reality, VR) terminal device, an augmented reality (Augmented Reality, AR) terminal device, a wireless terminal device related to industrial control (industrial control), a wireless terminal device related to self-driving (self-driving), a wireless terminal device related to remote medical (remote medical), a wireless terminal device related to a smart grid (smart grid), a wireless terminal device related to transportation safety (transportation safety), a wireless terminal device related to a smart city (smart city), a wireless terminal device related to a smart home (smart home), or the like.

As an example rather than a limitation, the terminal device may also be a wearable device. A wearable device may also be referred to as a wearable intelligent device, and is a general term of wearable devices, such as glasses, gloves, watches, clothes, and shoes, that are developed by applying wearable technologies in intelligent designs of daily wear. A wearable device is a portable device that can be directly worn on a body or integrated into clothes or an accessory of a user. A wearable device is not only a hardware device, but also used to implement a powerful function through software support, data exchange, and cloud interaction. In a broad sense, wearable smart devices include full-featured and large-sized devices that implement complete or partial functions without relying on smartphones, such as: smart watches or smart glasses, and devices that focus on only one type of application and need to work with other devices such as smartphones, such as various smart bracelets or smart jewelry for monitoring physical signs.

As shown in FIG. 1, the wireless communication system 100 includes an edge data center 150, and the edge data center 150 includes an edge routing switch 151 and a business server 152. In some embodiments, the wireless communication system 100 may include multiple edge data centers, and each edge data center may include other number of edge routing switches and business servers, which is not limited in the embodiments of this disclosure.

In some embodiments, the wireless communication system 100 may further include another network entity such as a network controller or a mobility management entity. This is not limited in the embodiments of this disclosure.

Based on the wireless communication system 100, the embodiments of this disclosure can use the traffic offloading capability of a 5G network to construct a mobile edge computing system at the edge of the 5G network so as to support an application mini program to access a local business server.

The embodiments of this disclosure relate to a cloud technology, and the cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Figure 2:
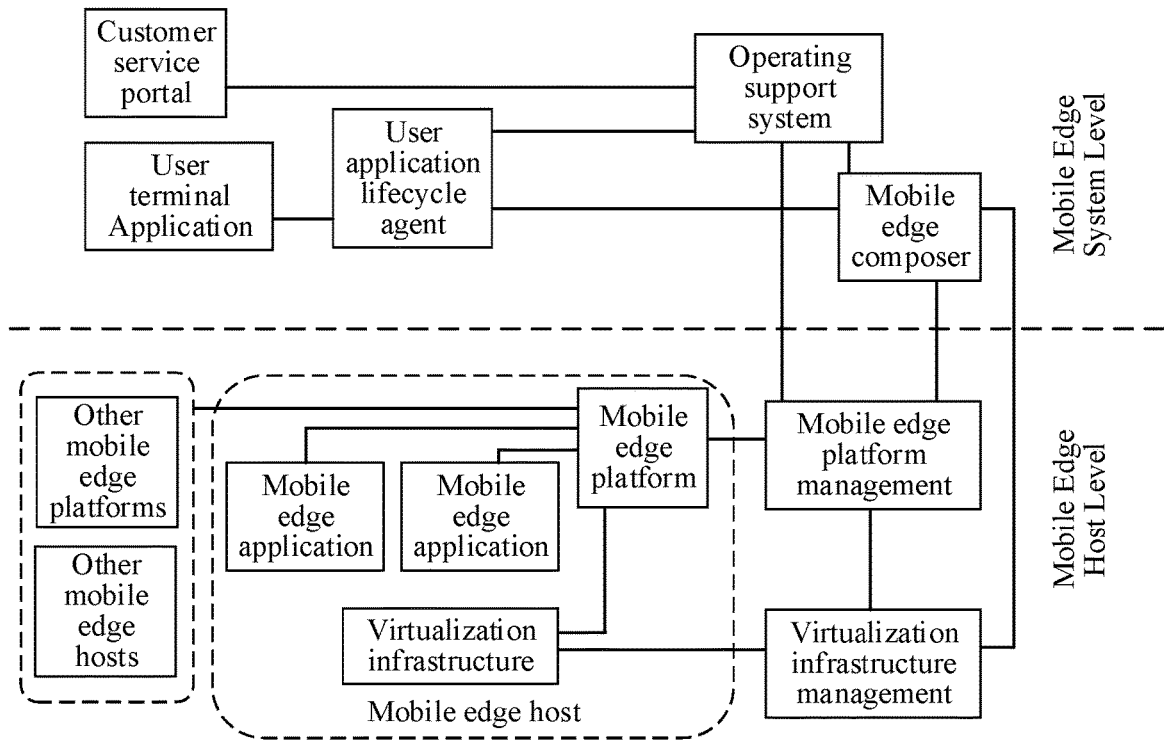
FIG. 2 is a schematic diagram of an ETSI-defined MEC architecture according to an embodiment of this disclosure.

Referring to FIG. 2, which is a schematic diagram of an ETSI-defined MEC architecture according to an embodiment of this disclosure, ETSI defines an edge computing platform architecture for mobile networks. Mobile edge applications are deployed in a mobile edge host in the form of entities, and have the ability to provide or use mobile edge services. The mobile edge host is an entity including a mobile edge platform and a virtualization infrastructure, which provides computing, storage, and network sources for various mobile edge applications. The underlying virtualization infrastructure provides computing, storage, and network sources for the upper mobile edge applications. The mobile edge platform runs feature sets required by various mobile edge applications in the mobile edge host, and can provide and use various mobile edge services. The mobile edge applications can subscribe and invoke mobile edge services to acquire capabilities opened by the underlying network, such as wireless network information, user location information, and network bandwidth management. Mobile edge host level is a management component and configured to implement specific management functions for specific mobile edge platform, mobile edge host, and mobile edge applications running on the mobile edge host. Mobile edge system level implements system management by maintaining a global view of the whole mobile edge system. For the mobile edge system level, ETSI introduces a mobile edge composer as a core component for global management of the whole system. For the mobile edge host level, ETSI defines application rules and requirements. The related rules and requirements set for various mobile edge applications mainly include: required sources, the maximum delay/latency, required or useful services, traffic rules, domain name system (DNS) rules, mobility support, etc.

The ETSI-defined MEC architecture is mainly used for services (e.g., enterprise in-house applications) running within local private networks, and does not have the ability to realize the collaboration between a central cloud and an edge data center. The processing logic of Internet services is complex. Usually, it is necessary to introduce an access layer into a data center located at the center of a network to schedule a server processing a specific service request. Internet services deployed based on the ETSI-defined MEC architecture cannot interact with access layer functions in an external data center, resulting in the destruction of the overall service logic. Furthermore, it is necessary to reconstruct a service front end, e.g., an application (APP). In addition, the ETSI-defined MEC architecture forms a private and closed service manage system, and an Internet service background system cannot effectively manage and control business servers deployed in the ETSI-defined MEC architecture.

In a case that the ETSI-defined MEC architecture is configured to support an application mini program to access a local business server, a service developer needs to enable each edge data center to assign an Internet protocol (IP) address within a network segment permitted by the application mini program to the local business server according to a designated service domain name. In a case that the service domain name is parsed by using a DNS server in a central cloud, it is necessary to assign a unified IP address to local business servers located in different edge data centers. In a case that the service domain name is parsed by using a DNS server in an edge cloud, the service developer needs to create a corresponding DNS record in each edge data center, and such operation is very complex. In a case that the service developer directly uses the ETSI-defined MEC architecture to assign an IP address to the local business server, service access may not be realized because the address is not in the network segment permitted by the application mini program.

In view of the above technical problems, the embodiments of this disclosure provide a wireless communication method, which can deploy service access layer functions and a business processing server in an edge data center, use the low latency of the edge data center to improve service access capabilities, and can use a service scheduler in a central cloud to effectively and reasonably manage and control edge services.

A specific implementation process of the wireless communication method provided in the embodiments of this disclosure is described below in detail.

Figure 3:
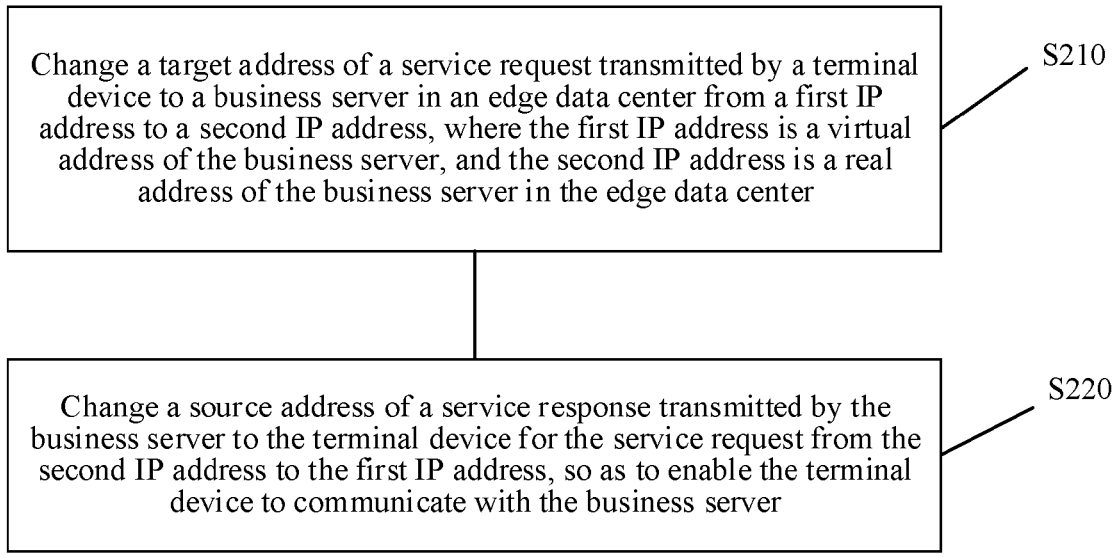
FIG. 3 is a schematic flowchart of a wireless communication method according to an embodiment of this disclosure.

FIG. 3 is a schematic flowchart of a wireless communication method 200 according to an embodiment of this disclosure. The wireless communication method can be implemented by the edge routing switch 151 shown in FIG. 1. Referring to FIG. 3, the wireless communication method 200 may at least include steps S210 and S220, which will be described in further detail below.

In step S210, an edge routing switch changes a target address of a service request transmitted by a terminal device to a business server in an edge data center from a first IP address to a second IP address. The first IP address is a virtual address of the business server, and the second IP address is a real address of the business server in the edge data center.

In step S220, the edge routing switch changes a source address of a service response transmitted by the business server to the terminal device for the service request from the second IP address to the first IP address, so as to enable the terminal device to communicate with the business server.

In some embodiments, the terminal device, when the terminal device accesses the business server in the edge data center, uses the first IP address (e.g., the virtual address of the business server), and in the edge data center, the first IP address is changed to the second IP address (e.g., the real address of the business server in the edge data center). The business server in the edge data center, when the edge data center feeds back to the terminal device, uses the second IP address (e.g., the real address of the business server in the edge data center), and in the edge data center, the second IP address is changed to the first IP address (e.g., the virtual address of the business server).

That is, in practice, communication between the terminal device and the business server can be achieved through interchange of the first IP address and the second IP address. Thus, the business server deployed in the edge data center can process the service request from the terminal device to implement Internet service delivery based on mobile edge computing, which can reduce the service latency and improve the user experience. In addition, the wireless communication method according to the embodiments of this disclosure neither affects the existing Internet service logic nor modifies an Internet service front end. A developer of a service mini program can use the service scheduler (e.g., a service background system in the central cloud) in the central cloud to manage and control edge services, so the wireless communication method has high applicability.

In some embodiments, the service request transmitted by the terminal device to the business server may be referred to as an IP data package. Similarly, the service response transmitted by the business server to the terminal device may also be referred to as an IP data package.

In some embodiments, the first IP address may be assigned according to an IP address network segment permitted by a service. Or, the first IP address may also be assigned according to an IP address network segment permitted by a service mini program in the terminal device. That is, the first IP address is an IP address permitted by a service, or, the first IP address is an IP address permitted by a service mini program in the terminal device.

In some embodiments, the second IP address may be assigned according to an IP address network segment permitted by an operator. That is, the second IP address is an IP address permitted by an operator.

In some embodiments, the first IP address and the second IP address are assigned by an edge service manager to the business server in the edge data center.

For example, during deployment of the local business server in the edge data center, the edge service manager assigns two IP addresses to the business server, one IP address (the second IP address) is a real address of the business server in the edge data center, and the other IP address (the first IP address) is a virtual address assigned according to an IP address network segment permitted by a service mini program.

In some embodiments, interchange of the first IP address and the second IP address is implemented through a first correspondence created by the edge service manager. The first correspondence includes a correspondence between the first IP address and the second IP address.

In practice, the edge service manager can create the first correspondence in the edge routing switch. Thus, the edge routing switch can implement interchange of the first IP address and the second IP address based on the first correspondence.

In some embodiments, the first correspondence is also applicable to other business servers in the edge data center, that is, the first correspondence can include correspondences between virtual addresses and real addresses of other business servers.

In addition, the first correspondence may also be referred to as a first mapping relationship, a first mapping table, etc., which is not limited in the embodiments of this disclosure.

The wireless communication method according to the embodiments of this disclosure is applicable to Internet services such as cloud gaming, video, and Internet of vehicles.

In some embodiments, data forwarding between the terminal device and the business server is implemented by using a user plane function entity.

In some embodiments, S210 can be implemented in the following manner: the edge routing switch receives a service request transmitted by a terminal device to a business server that is forwarded by a user plane function entity; the edge routing switch changes a target address of the service request from a first IP address to a second IP address; and the edge routing switch transmits the service request to the business server after changing the target address of the service request from the first IP address to the second IP address.

In some embodiments, S220 can be implemented in the following manner: the edge routing switch receives a service response transmitted by the business server to the terminal device for the service request; the edge routing switch changes a source address of the service response from the second IP address to the first IP address; and the edges routing switch transmits the service response to the terminal device through the user plane function entity after changing the source address of the service response from the second IP address to the first IP address.

Figure 4:
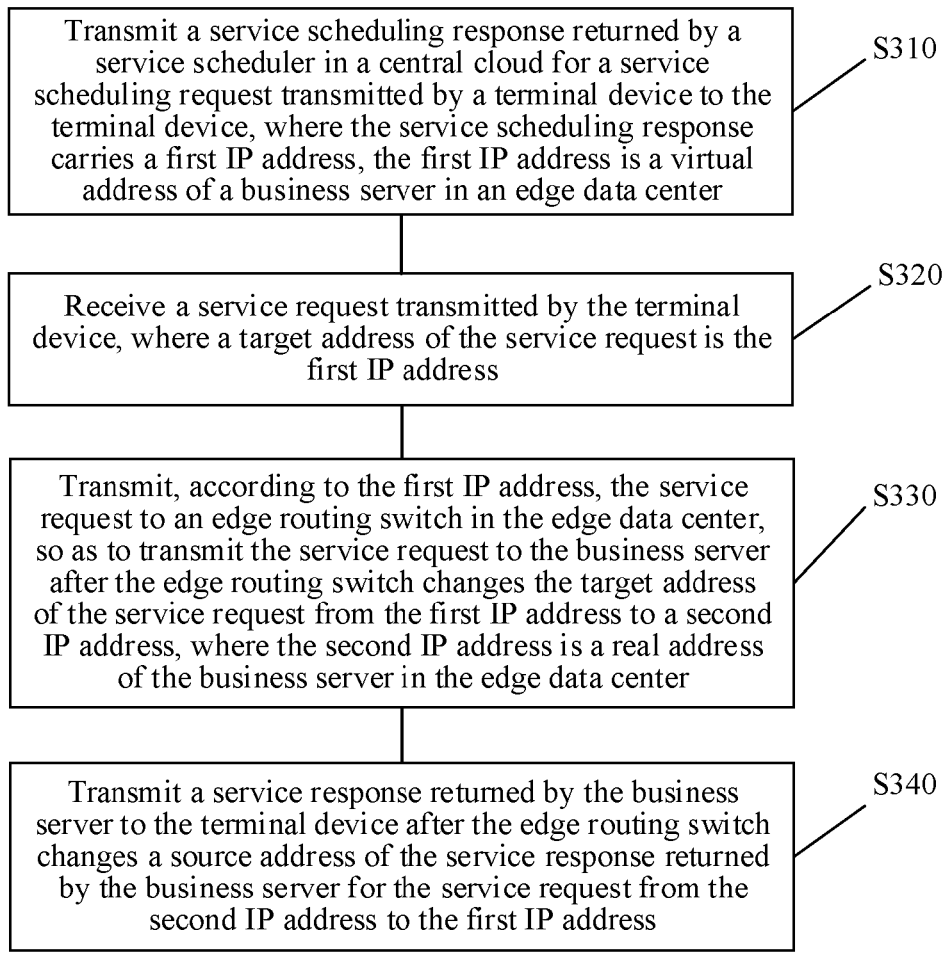
FIG. 4 is a schematic flowchart of a wireless communication method according to an embodiment of this disclosure.

FIG. 4 is a schematic flowchart of a wireless communication method 300 according to an embodiment of this disclosure. The wireless communication method 300 can be implemented by the user plane function entity 120 shown in FIG. 1. As shown in FIG. 4, the wireless communication method 300 may at least include steps S310 to S340, which will be described in detail below.

In step S310, a service scheduling response returned by a service scheduler in a central cloud for a service scheduling request transmitted by a terminal device is transmitted to the terminal device. The service scheduling response carries a first IP address, and the first IP address is a virtual address of a business server in an edge data center.

In some embodiments, first, the service scheduling request transmitted by the terminal device is forwarded to the service scheduler in the central cloud; then, the service scheduling response returned by the service scheduler in the central cloud for the service scheduling request transmitted by the terminal device is received; finally, the service scheduling response is transmitted to the terminal device.

In some embodiments, during deployment of the local business server in the edge data center, an edge service manager assigns two IP addresses to the business server, one IP address is a real address (a second IP address) of the business server in the edge data center, and the other IP address is a virtual address (a first IP address) assigned according to an IP address network segment permitted by a service mini program. In addition, the edge service manager informs the service scheduler in the central cloud of the first IP address.

In some embodiments, in a case that the service scheduler in the central cloud determines that the business server in the edge data center can process the service scheduling request, the service scheduling response (carrying the first IP address) returned by the service scheduler for the service scheduling request transmitted by the terminal device is received.

That is, the service scheduler in the central cloud determines whether the service scheduling request can be processed by the business server in the edge data center after receiving the service scheduling request transmitted by the terminal device, and returns the first IP address to the terminal device in a case that the service scheduler determines that the service scheduling request can be processed by the business server in the edge data center.

In step S320, a service request transmitted by the terminal device is received. A target address of the service request is the first IP address.

In some embodiments, the terminal device transmits a service access request taking the first IP address as a target address to the business server in the edge data center after receiving the first IP address returned by the service scheduler in the central cloud. In this case, a user plane function entity receives the service request transmitted by the terminal device.

In step S330, according to the first IP address, the service request is transmitted to an edge routing switch in the edge data center, so as to transmit the service request to the business server after the edge routing switch changes the target address of the service request from the first IP address to a second IP address. The second IP address is a real address of the business server in the edge data center.

In some embodiments, the edge service manager can create an IP address list in the user plane function entity, and the service request is transmitted to the edge routing switch in the edge data center in a case that the first IP address belongs to the IP address list created by the edge service manager.

That is, the user plane function entity detects the target address of the service request after receiving the service request transmitted by the terminal device, and transmits the service request to the edge routing switch in the edge data center after determining that the target address of the service request meets the requirements for forwarding to the edge routing switch in the edge data center.

The terminal device, when the terminal device accesses the business server in the edge data center (e.g., file download and video download), uses the first IP address (e.g., the virtual address of the business server), and in the edge data center, the edge routing switch changes the first IP address to the second IP address (e.g., the real address of the business server in the edge data center). As a result, the terminal device can access the business server.

In step S340, a service response returned by the business server is transmitted to the terminal device after the edge routing switch changes a source address of the service response returned by the business server for the service request from the first IP address to the second IP address.

The business server in the edge data center, when the business server feeds back to the terminal device, uses the second IP address (e.g., the real address of the business server in the edge data center), and in the edge data center, the edge routing switch changes the second IP address to the first IP address (e.g., the virtual address of the business server). As a result, the business server can feed back to the terminal device through the user plane function entity.

In some embodiments, the terminal device, when the terminal device accesses the business server in the edge data center, uses the first IP address (e.g., the virtual address of the business server), and in the edge data center, the first IP address is changed to the second IP address (e.g., the real address of the business server in the edge data center). The business server in the edge data center, when the business server feeds back to the terminal device, uses the second IP address (e.g., the real address of the business server in the edge data center), and in the edge data center, the second IP address is changed to the first IP address (e.g., the virtual address of the business server).

That is, in practice, communication between the terminal device and the business server can be achieved through interchange of the first IP address and the second IP address. Thus, the business server deployed in the edge data center can process the service request from the terminal device to implement Internet service delivery based on mobile edge computing, which can reduce the service latency and improve the user experience. In addition, the wireless communication method according to the embodiments of this disclosure neither affects the existing Internet service logic nor modifies an Internet service front end. A developer of a service mini program can use the service scheduler (e.g., a service background system in the central cloud) in the central cloud to manage and control edge services, so the wireless communication method has high applicability.

In some embodiments, the first IP address may be assigned according to an IP address network segment permitted by a service. Or, the first IP address may also be assigned according to an IP address network segment permitted by a service mini program in the terminal device. That is, the first IP address is an IP address permitted by a service, or, the first IP address is an IP address permitted by a service mini program in the terminal device.

In some embodiments, the second IP address may be assigned according to an IP address network segment permitted by an operator. That is, the second IP address is an IP address permitted by an operator.

In some embodiments, the first IP address and the second IP address are assigned by the edge service manager to the business server in the edge data center.

For example, during deployment of the local business server in the edge data center, the edge service manager assigns two IP addresses to the business server, one IP address is a real address (the second IP address) of the business server in the edge data center, and the other IP address is a virtual address (the first IP address) assigned according to an IP address network segment permitted by a service mini program.

In some embodiments, interchange of the first IP address and the second IP address is implemented through a first correspondence created by the edge service manager. The first correspondence includes a correspondence between the first IP address and the second IP address.

The edge service manager can create the first correspondence in the edge routing switch. Thus, the edge routing switch can implement interchange of the first IP address and the second IP address based on the first correspondence.

In some embodiments, the first correspondence is also applicable to other business servers in the edge data center, that is, the first correspondence can also include correspondences between virtual addresses and real addresses of other business servers.

In addition, the first correspondence may be also referred to as a first mapping relationship, a first mapping table, etc., which is not limited in the embodiments of this disclosure.

The wireless communication method according to the embodiments of this disclosure is also applicable to Internet services such as cloud gaming, video, and Internet of vehicles.

According to the embodiments of this disclosure, a target address of a service request transmitted by a terminal device to a business server is changed from a first IP address to a second IP address, and a source address of a service response transmitted by the business server to the terminal device for the service request is changed from the second IP address to the first IP address. As a result, communication between the terminal device and the business server can be achieved through interchange of a virtual address and a real address. In addition, service access layer functions and a business processing server are deployed in an edge data center, the low latency of the edge data center is used to improve service access capabilities, and a service scheduler in a central cloud can be used to effectively and reasonably manage and control edge services.

Figure 5:
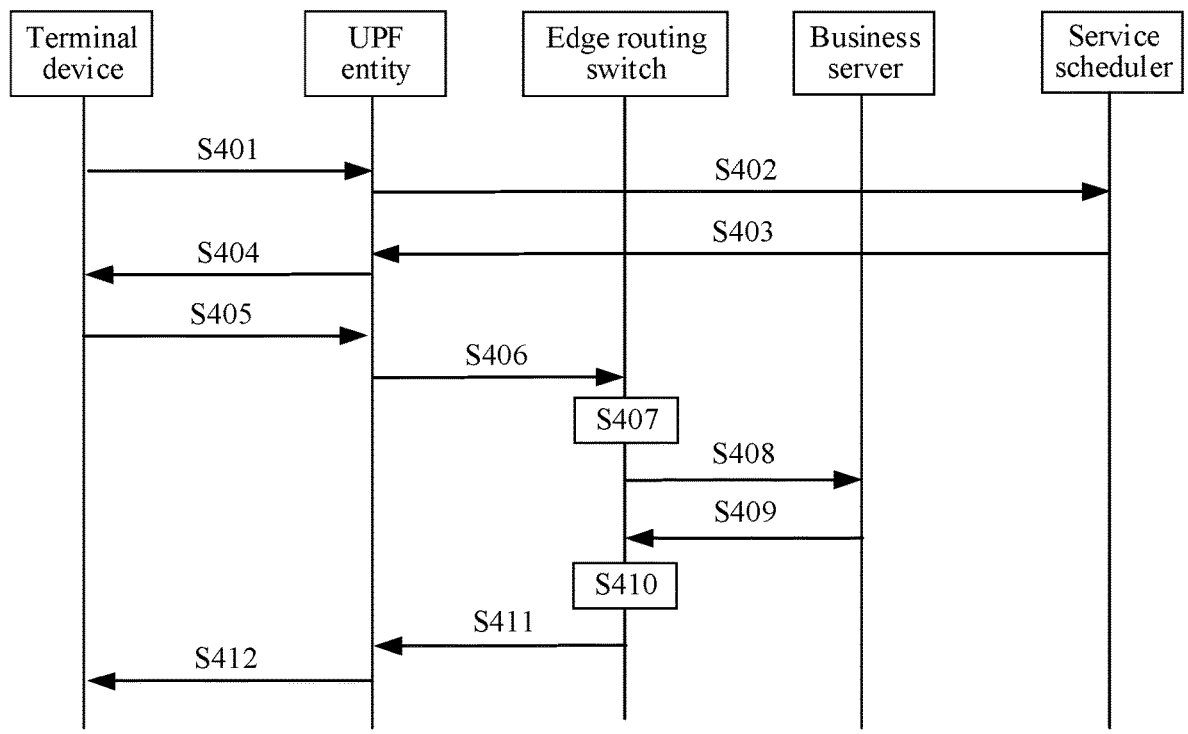
FIG. 5 is an interaction flowchart of a wireless communication method according to an embodiment of this disclosure.

Referring to FIG. 5, which is an interaction flowchart of a wireless communication method according to an embodiment of this disclosure, the method includes the following steps:

In step S401, a terminal device transmits a service scheduling request to a UPF entity.

In step S402, the UPF entity forwards the service scheduling request to a service scheduler in a central cloud.

In step S403, the service scheduler feeds a service scheduling response for the service scheduling request to the UPF entity in a case that the service scheduler determines that a business server in an edge data center can process the service scheduling request. The service scheduling response carries a first IP address, and the first IP address is a virtual address of the business server.

In step S404, the UPF entity forwards the service scheduling response to the terminal device.

In step S405, the terminal device transmits a service request to the UPF entity according to the first IP address carried in the service scheduling response. A target address of the service request is the first IP address.

In step S406, the UPF entity transmits the service request to an edge routing switch in the edge data center through an internal network of the edge data center after the UPF entity receives the service request and determines that the first IP address belongs to an IP address list created by an edge service manager by detection.

In step S407, the edge routing switch changes the target address of the service request from the first IP address to a second IP address. The second IP address is a real address of the business server.

In step S408, the edge routing switch transmits the service request to the business server after changing the target address of the service request from the first IP address to the second IP address.

In step S409, the business server extracts requested content from a memory after receiving the service request, and transmits the requested content as a service response to the edge routing switch. A source address of the service response is the second IP address.

In step S410, the edge routing switch changes the source address of the service response from the second IP address to the first IP address after receiving the service response.

In step S411, the edge routing switch transmits the service response to the UPF entity after changing the source address of the service response from the second IP address to the first IP address.

In step S412, the UPF entity forwards the service response to the terminal device.

The processing at various steps shown in FIG. 5 can be similar to the steps shown in FIG. 3 and FIG. 4, which will not be described in detail again herein.

According to the above method, a target address of a service request transmitted by a terminal device to a business server is changed from a first IP address to a second IP address, and a source address of a service response transmitted by the business server to the terminal device for the service request is changed from the second IP address to the first IP address. As a result, communication between the terminal device and the business server can be achieved through interchange of a virtual address and a real address. In addition, service access layer functions and a business processing server are deployed in an edge data center, the low latency of the edge data center is used to improve service access capabilities, and a service scheduler in a central cloud can be used to effectively and reasonably manage and control edge services.

Figure 6:
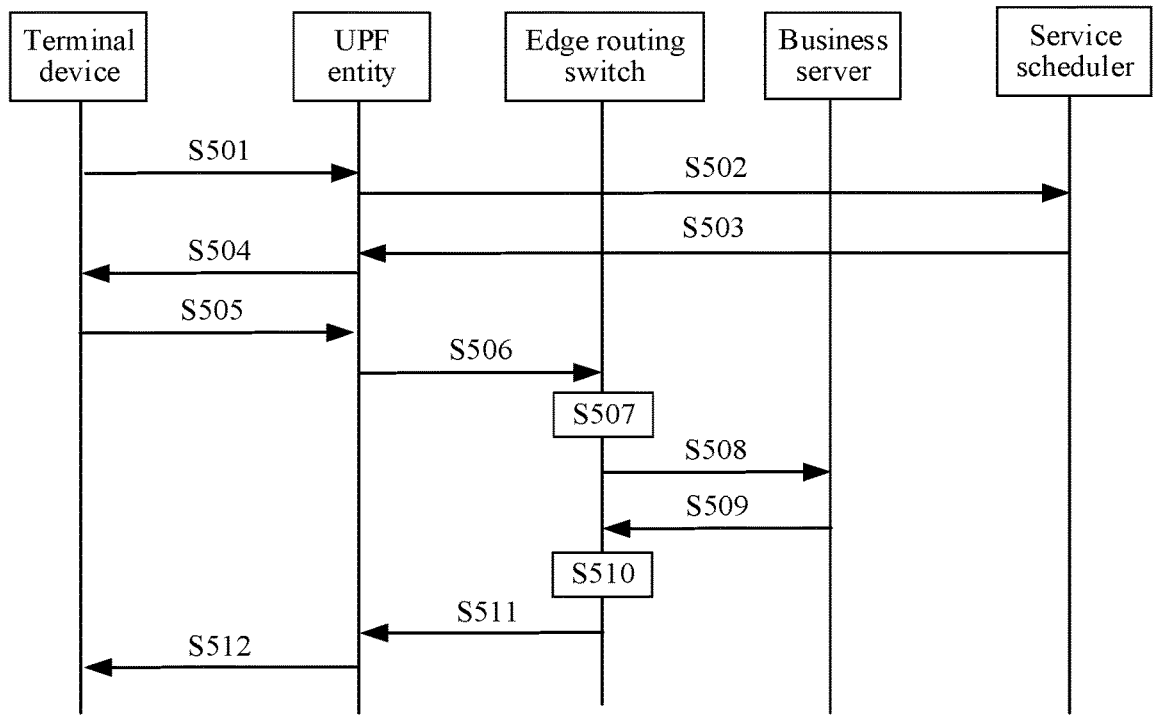
FIG. 6 is an interaction flowchart of a video download process according to an embodiment of this disclosure.

Referring to FIG. 6, which is an interaction flowchart of a video download method according to an embodiment of this disclosure, the video download method is applied to a scenario where a terminal device downloads videos from a business server in an edge data center and includes the following steps:

In step S501, a terminal device transmits a video scheduling request to a UPF entity.

In step S502, the UPF entity forwards the video scheduling request to a service scheduler in a central cloud.

In step S503, the service scheduler generates, according to the content of the video scheduling request, a video scheduling response in a case that the service scheduler determines that a business server in an edge data center can process the video scheduling request, and feeds the video scheduling response back to the UPF entity. The video scheduling response contains a virtual address IP-A of the business server.

In step S504, the UPF entity forwards the video scheduling response to the terminal device.

In step S505, the terminal device transmits a video download request to the UPF entity according to IP-A carried in the video scheduling response. A target address of the video download request is IP-A.

In step S506, the UPF entity forwards the video download request to an edge routing switch in the edge data center after the UPF entity receives the video download request and determines that IP-A meets local diversion rules by detection.

In step S507, the edge routing switch changes the target address IP-A of the video download request to a real address IP-B of the business server.

In step S508, the edge routing switch transmits the modified video download request to the business server.

In step S509, the business server extracts a video file from a memory after receiving the modified video download request, and transmits the video file as a video response to the edge routing switch. A source address of the video response is IP-B.

In step S510, the edge routing switch changes the source address of the video response to IP-A after receiving the video response.

In step S511, the edge routing switch transmits the modified video response to the UPF entity.

In step S512, the UPF entity forwards the video response to the terminal device.

Although the steps of the method in this disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 7:
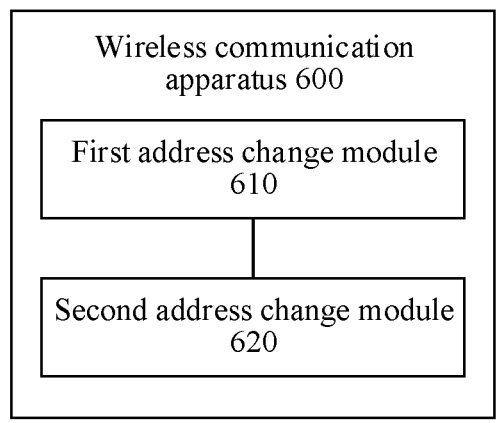
FIG. 7 is a schematic structural diagram of a wireless communication apparatus according to an embodiment of this disclosure.

In some embodiments, referring to FIG. 7, which is a schematic structural diagram of a wireless communication apparatus 600 according to an embodiment of this disclosure, the wireless communication apparatus includes a first address change module 610 and a second address change module 620. One or more modules, submodules, and/or units of the apparatus can be implemented by processing circuitry, software, or a combination thereof, for example.

The first address change module 610 is configured to change a target address of a service request transmitted by a terminal device to a business server in an edge data center from a first IP address to a second IP address, the first IP address being a virtual address of the business server, the second IP address being a real address of the business server in the edge data center. The second address change module 620 is configured to change a source address of a service response transmitted by the business server to the terminal device for the service request from the second IP address to the first IP address, so as to enable the terminal device to communicate with the business server.

In some embodiments, the first IP address is assigned according to an IP address network segment permitted by a service.

In some embodiments, the first IP address and the second IP address are assigned by an edge service manager to the business server.

In some embodiments, interchange of the first IP address and the second IP address is implemented through a first correspondence created by the edge service manager. The first correspondence includes a correspondence between the first IP address and the second IP address.

In some embodiments, data forwarding between the terminal device and the business server is implemented by using a user plane function entity.

It is to be understood that, the wireless communication apparatus 600 provided in the embodiments of this disclosure may correspond to the method embodiments of this disclosure, and the foregoing operations and/or functions and another operation and/or function of the units in the wireless communication apparatus 600 are respectively for implementing corresponding procedures in the method 200 shown in FIG. 3. For brevity, details are not described herein again.

Figure 8:
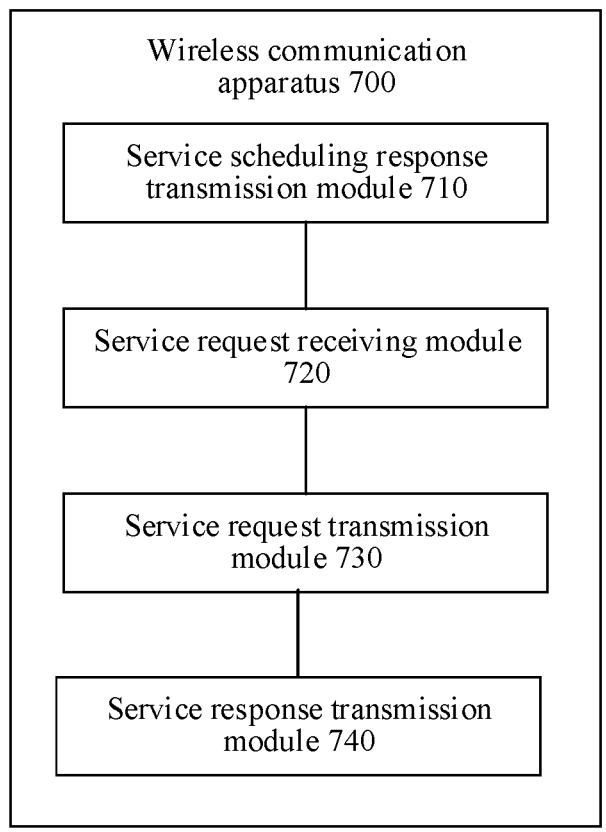
FIG. 8 is a schematic structural diagram of a wireless communication apparatus according to an embodiment of this disclosure.

In some embodiments, referring to FIG. 8, which is a schematic structural diagram of a wireless communication apparatus 700 according to an embodiment of this disclosure, the wireless communication apparatus includes a service scheduling response transmission module 710, a service request receiving module 720, a service request transmission module 730, and a service response transmission module 740. One or more modules, submodules, and/or units of the apparatus can be implemented by processing circuitry, software, or a combination thereof, for example.

The service scheduling response transmission module 710 is configured to transmit a service scheduling response returned by a service scheduler in a central cloud for a service scheduling request transmitted by a terminal device to the terminal device, the service scheduling response carrying a first IP address, the first IP address being a virtual address of a business server in an edge data center.

The service request receiving module 720 is configured to receive a service request transmitted by the terminal device, a target address of the service request being the first IP address;

The service request transmission module 730 is configured to transmit, according to the first IP address, the service request to an edge routing switch in the edge data center, so as to transmit the service request to the business server after the edge routing switch changes the target address of the service request from the first IP address to a second IP address, the second IP address being a real address of the business server in the edge data center.

The service response transmission module 740 is configured to transmit a service response returned by the business server to the terminal device after the edge routing switch changes a source address of the service response returned by the business server for the service request from the second IP address to the first IP address.

In some embodiments, the service request transmission module 730 is further configured to transmit the service request to the edge routing switch in the edge data center in a case that the first IP address belongs to an IP address list created by an edge service manager.

In some embodiments, the first IP address is assigned according to an IP address network segment permitted by a service.

In some embodiments, the first IP address and the second IP address are assigned by the edge service manager to the business server.

It is to be understood that, the wireless communication apparatus 700 in the embodiments of this disclosure may correspond to the method embodiments of this disclosure, and the foregoing operations and/or functions and another operation and/or function of the units in the network device 700 are respectively for implementing corresponding procedures in the method 300 shown in FIG. 4. For brevity, details are not described herein again.

The units in the foregoing wireless communication apparatus may be implemented entirely or partially by software, hardware, or a combination thereof. The foregoing units may be built in or independent of a processor of a computer device in a hardware form, or may be stored in a memory of the computer device in a software form, so that the processor invokes and performs an operation corresponding to each of the foregoing units.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 9:
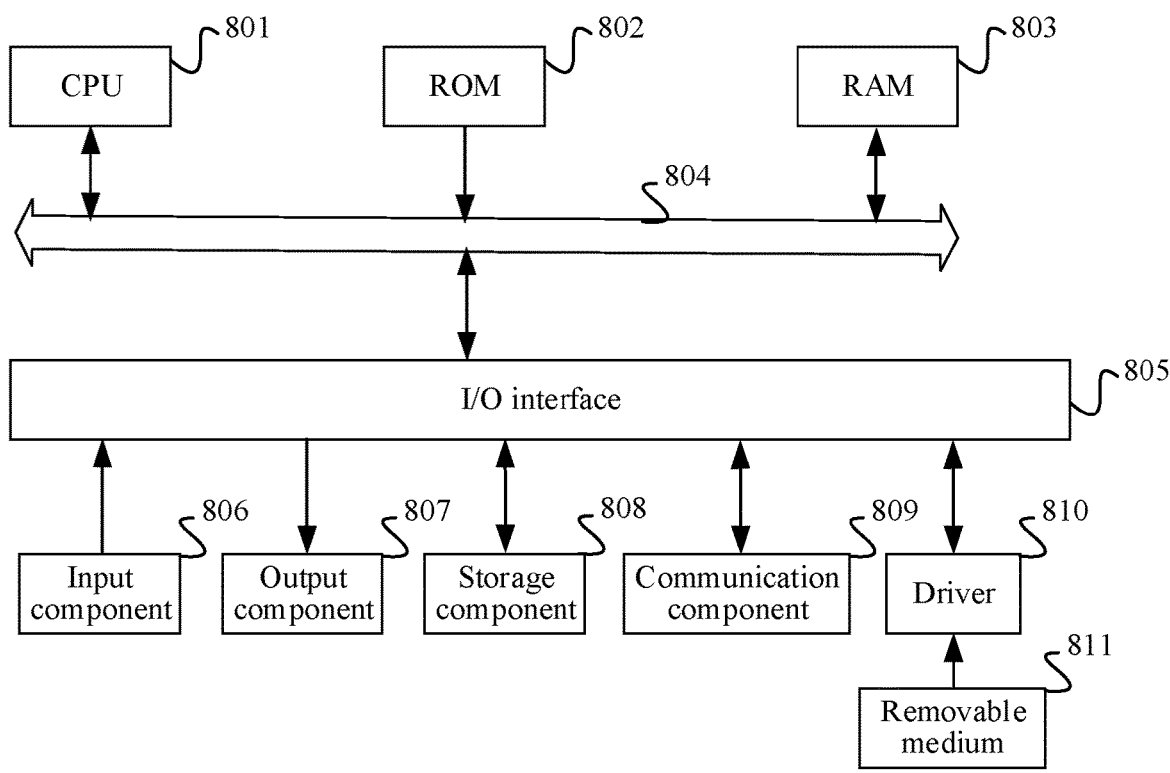
FIG. 9 is a schematic structural diagram of a computer system of an electronic device according to an embodiment of this disclosure.

Referring to FIG. 9, FIG. 9 is a schematic structural diagram of a computer system of an electronic device according to an embodiment of this disclosure. The computer system 800 implementing the electronic device shown in FIG. 9 is merely an example, and is not to impose any limitation on a function and use scope of the embodiments of this disclosure.

As shown in FIG. 9, the computer system 800 includes a central processing unit (CPU) 801. The CPU 801 may perform various proper actions and processing according to a program stored in a read-only memory (ROM) 802 or a program loaded from a storage part 808 into a random access memory (RAM) 803. The RAM 803 further stores various programs and data required for system operations. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard and a mouse, etc.; an output component 807 including, for example, a cathode ray tube (CRT) and a liquid crystal display (LCD), a speaker, etc.; a storage part 808 including hard disk, etc.; and a communication part 809 including a network interface card such as a local area network (LAN) card or a modem, etc. The communication part 809 performs communication processing by using a network such as the Internet. A drive 810 is also connected to the I/O interface 805 as required. A removable medium 811, such as a magnetic disk, an optical disc, a magneto-optical disk, or a semiconductor memory, is mounted on the driver 810 as required, so that a computer program read from the removable medium is installed into the storage part 808 as required.

According to an embodiment of this disclosure, the processes described in the foregoing flowcharts may be implemented as computer software programs. For example, this embodiment of this disclosure includes a computer program product, the computer program product includes a computer program carried on a computer-readable medium, and the computer program includes program code used for performing the methods shown in the foregoing flowcharts. By using the communication part 809, the computer program may be downloaded and installed on a network, and/or installed from the removable medium 811. When the computer program is executed by the CPU 801, the various functions defined in the apparatus of this disclosure are executed.

An embodiment of this disclosure further provides an electronic device, including a processor and a memory. The memory is configured to store executable instructions of the processor. The processor is configured to perform the wireless communication method by executing the executable instructions.

An embodiment of this disclosure further provides a computer device, including a memory and a processor, the memory storing a computer program, the processor, when executing the computer program, performing the wireless communication method.

An embodiment of this disclosure further provides a computer-readable storage medium (e.g., a non-transitory computer-readable storage medium), storing a computer program, the computer program, when executed by a processor, performing the wireless communication method.

The computer-readable storage medium described in this disclosure may be for example, but is not limited to, an electric, magnetic, optical, electromagnetic, infrared, or semi-conductive system, apparatus, or component, or any combination thereof. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the embodiments of this disclosure, the computer-readable storage medium may be any tangible medium including or storing a program, and the program may be used by or in combination with an instruction execution system, apparatus, or device. In the embodiments of this disclosure, the computer-readable signal medium may include a data signal propagated in a baseband or as a part of a carrier, and stores computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code included in the readable-readable medium may be transmitted using any suitable medium, including but not limited to: a wireless medium, a wired medium, an optical cable, RF, or any suitable combination thereof.

Selection of the above software and hardware platform architecture, development environment, development languages, message acquisition sources, etc. that are used for only describing the embodiments of this disclosure can be changed. Based on the technical solutions of this disclosure, improvements and equivalent changes made to a certain part according to the principle of the embodiments of this disclosure shall not be excluded from the scope of protection of this disclosure.

The terms used in the embodiments and the appended claims of this disclosure are merely used for illustrating specific embodiments, and are not intended to limit the embodiments of this disclosure.

A person skilled in the art may notice that the exemplary units and algorithm steps described with reference to the embodiments of this disclosure can be implemented in electronic hardware, or a combination of computer software and electronic hardware. Whether the functions are executed in a mode of hardware or software depends on particular applications and design constraint conditions of the technical solutions.

When the functions are implemented in a form of a software functional unit and sold or used as an independent product, the functions may be stored in a computer-readable storage medium. Based on such an understanding, the technical solutions of the embodiments of this disclosure may be implemented in the form of a software product. The computer software product is stored in a storage medium, and includes several instructions for instructing a computer device (which may be a personal computer, a server, a network device, and the like) to perform all or a part of the steps of the method described in the embodiments of this disclosure. The above storage media include: any medium that can store program code, such as a USB flash drive, a removable hard disk, a read-only memory, a random access memory, a magnetic disk, or an optical disc.

It may be understood by a person skilled in the art that, for the purpose of convenient and brief description, for a detailed working process of the foregoing device, apparatus, and unit, reference may be made to a corresponding process in the foregoing method embodiments as examples, and details are not described herein again.

It is to be understood that, in the embodiments provided in this disclosure, the disclosed electronic devices, apparatuses, and methods may be implemented in other manners.

For example, the division of the units or modules or components in the foregoing described apparatus embodiments is merely the division of logic functions, and may use other division manners during actual implementation. For example, a plurality of units or modules or components may be combined, or may be integrated into another system, or some units or modules or components may be omitted or skipped.

In another example, the units/modules/components described as separate/displayed components may or may not be physically separated, that is, may be located in one place or may be distributed over multiple network units. Some or all of the units/modules/components may be selected according to actual needs to achieve the objectives of the embodiments of this disclosure.

The shown or discussed mutual couplings or direct couplings or communication connections may be implemented through some interfaces. The indirect couplings or communication connections between the apparatus or units may be implemented in electronic, mechanical, or other forms.

The foregoing descriptions are merely specific implementations of the embodiments of this disclosure, but are not intended to limit the scope of the embodiments of this disclosure. Other embodiments shall fall within the scope of the embodiments of this disclosure.

What is claimed is:

1. A wireless communication method, the method comprising:
    receiving a service request transmitted by a terminal device to an edge data center, the edge data center including an edge routing switch and a local server;
    changing, by the edge routing switch of the edge data center, a target address of the service request from a first IP address to a second IP address based on a mapping between the first IP address and the second IP address, the mapping being created and updated by an edge service manager and provided to the edge routing switch, the first IP address being a virtual address of the local server in the edge data center, the second IP address being a real address of the local server in the edge data center;
    receiving a service response transmitted by the local server to the terminal device for the service request; and
    changing, by the edge routing switch, a source address of the service response from the second IP address to the first IP address.

2. The method according to claim 1, wherein the edge routing switch is included in a 5G network and configured to enable the terminal device to communicate with the local server.

3. The method according to claim 1, wherein the first IP address is assigned according to an IP address network segment permitted by a service associated with mini program of an application.

4. The method according to claim 1, wherein the first IP address and the second IP address are assigned by the edge service manager to the local server.

5. The method according to claim 1, wherein a correspondence between the first IP address and the second IP address is determined by the edge service manager.

6. The method according to claim 1, wherein the service request and the service response are transmitted via a user plane function.

7. A wireless communication method, the method comprising:
    receiving a service scheduling response from a service scheduler in a central cloud for a service scheduling request transmitted by a terminal device;

transmitting the service scheduling response to the terminal device, the service scheduling response including a first IP address that is a virtual address of a local server in an edge data center;

receiving, by a user plane function of a wireless network, a service request from the terminal device, a target address of the service request being the first IP address;

transmitting, by the user plane function and according to the first IP address, the service request to an edge routing switch in the edge data center, the edge routing switch being configured to transmit the service request to the local server after the edge routing switch changes the target address of the service request from the first IP address to a second IP address, the second IP address being a real address of the local server in the edge data center; and transmitting, by the user plane function, a service response returned by the local server to the terminal device after the edge routing switch changes a source address of the service response returned by the local server for the service request from the second IP address to the first IP address.

8. The method according to claim 7, wherein the transmitting the service request comprises:

transmitting the service request to the edge routing switch in the edge data center when the first IP address is included in an IP address list that is generated by an edge service manager.

9. The method according to claim 7, wherein the first IP address is assigned according to an IP address network segment permitted by a service.

10. The method according to claim 7, wherein the first IP address and the second IP address are assigned by an edge service manager to the local server.

11. A wireless communication system, comprising:

an edge routing switch of an edge data center, the edge routing switch including first processing circuitry that is configured to:

receive a service request transmitted by a terminal device to the edge data center, the edge data center including the edge routing switch and a local server;

change a target address of the service request from a first IP address to a second IP address based on a mapping between the first IP address and the second IP address, the mapping being created and updated by an edge service manager and provided to the edge routing switch, the first IP address being a virtual address of the local server in the edge data center, the second IP address being a real address of the local server in the edge data center;

receive a service response transmitted by the local server to the terminal device for the service request; and change a source address of the service response from the second IP address to the first IP address.

12. The wireless communication system according to claim 11, wherein the edge routing switch is included in a 5G network and configured to enable the terminal device to communicate with the local server.

13. The wireless communication system according to claim 11, wherein the first IP address is assigned according to an IP address network segment permitted by a service associated with a mini program of an application.

14. The wireless communication system according to claim 11, wherein the first IP address and the second IP address are assigned by the edge service manager to the local server.

15. The wireless communication system according to claim 11, wherein a correspondence between the first IP address and the second IP address is determined by the edge service manager.

16. The wireless communication system according to claim 11, wherein the service request and the service response are transmitted via a user plane function.

17. The wireless communication system according to claim 11, further comprising:

second processing circuitry of a user plane function, the second processing circuitry being configured to:

receive a service scheduling response from a service scheduler in a central cloud for a service scheduling request transmitted by the terminal device;

transmit the service scheduling response to the terminal device, the service scheduling response including the first IP address that is the virtual address of the local server in an edge data center;

receive the service request from the terminal device, the target address of the service request being the first IP address;

transmit, according to the first IP address, the service request to the edge routing switch in the edge data center; and transmit the service response returned by the local server to the terminal device after the edge routing switch changes the source address of the service response returned by the local server for the service request from the second IP address to the first IP address.

18. The wireless communication system according to claim 17, wherein the second processing circuitry is configured to:

transmit the service request to the edge routing switch in the edge data center when the first IP address is included in an IP address list that is generated by the edge service manager.

19. The wireless communication method according to claim 1, further comprising:

receiving a service scheduling response from a service scheduler in a central cloud for a service scheduling request transmitted by the terminal device;

transmitting the service scheduling response to the terminal device, the service scheduling response including the first IP address that is the virtual address of the local server in the edge data center;

receiving the service request from the terminal device, the target address of the service request being the first IP address;

transmitting, according to the first IP address, the service request to the edge routing switch in the edge data center; and transmitting the service response returned by the local server to the terminal device after the edge routing switch changes the source address of the service response returned by the local server for the service request from the second IP address to the first IP address.

20. The wireless communication method according to claim 19, wherein the service request is transmitted to the edge routing switch in the edge data center when the first IP address is included in an IP address list that is generated by the edge service manager.

* * * * *